W. FROST.
CHUCKS FOR HOLDING METAL DRILLS.

No. 176,854. Patented May 2, 1876.

WITNESSES:
Francis McArdle,
John Goethals

INVENTOR:
W. Frost
BY
ATTORNEYS.

UNITED STATES PATENT OFFICE.

WILLIAM FROST, OF NEW BEDFORD, MASSACHUSETTS.

IMPROVEMENT IN CHUCKS FOR HOLDING METAL DRILLS.

Specification forming part of Letters Patent No. 176,854, dated May 2, 1876; application filed March 25, 1876.

*To all whom it may concern:*

Be it known that I, WILLIAM FROST, of New Bedford, in the county of Bristol and State of Massachusetts, have invented a new and Improved Drill-Chuck, of which the following is a specification:

My invention consists of a sliding jaw having a triangular notch and a couple of toothed jaws fixed to slide at right angles to the movement of the other, and arranged in its notch, and being notched or toothed, so that one meshes in the other, and having a spring between them, for opening them, all being arranged in a stock which attaches to the mandrel, and being so contrived that round, square, or other shapes, either taper or straight, may be held with like facility.

Figure 1:
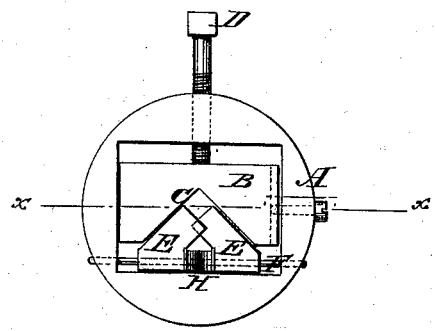
Figure 2:
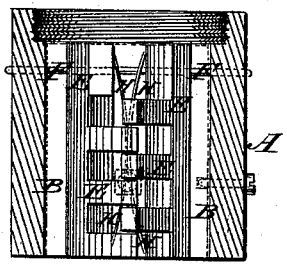

Figure 1 is an end elevation of my improved chuck. Fig. 2 is a longitudinal section taken on line $x$ $x$ of Fig. 1.

Similar letters of reference indicate corresponding parts.

A is the stock having a square socket in it, in which the jaw B, having the large Λ-shaped notch C, is fitted to slide transversely, and has an adjusting-screw, D, provided for shifting it. E represents other jaws fixed on the rod F, to move toward and from each other at right angles with the directions in which jaw B moves, and being fitted in the notch parallel with its inclined sides respectively, the parts fitted therein being notched or toothed so as to mesh together and close into each other for increasing and diminishing the space between them and the bottom of the notch C, and between said jaws are springs H, which open them when jaw B is moved back, and allow them to close when it is moved forward on them. The pin F is located at the inner end of the chuck, and the jaw B is free to oscillate a little, so that the jaws will accommodate themselves to a taper shape, and they will take a round, square, or other form.

Having thus described my invention, I claim as new and desire to secure by Letters Patent—

1. The combination of the sliding and oscillating jaw B, having notch C, and the laterally-adjusting notched and meshing jaws E, substantially as specified.

2. The combination of springs H with the jaws E and B, substantially as specified.

WILLIAM FROST.

Witnesses:
  ORTON S. SIMPSON,
  WILLIAM ROSCOE.